United States Patent
Rakshit et al.

(10) Patent No.: US 10,621,205 B2
(45) Date of Patent: Apr. 14, 2020

(54) PRE-REQUEST EXECUTION BASED ON AN ANTICIPATED AD HOC REPORTING REQUEST

(71) Applicant: INTERNATIONAL BUSINESS MACHINES CORPORATION, Armonk, NY (US)

(72) Inventors: Sarbajit K. Rakshit, Kolkata (IN); Kimberly G. Starks, Nashville, TN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 350 days.

(21) Appl. No.: 15/414,677

(22) Filed: Jan. 25, 2017

(65) Prior Publication Data

US 2018/0210941 A1 Jul. 26, 2018

(51) Int. Cl.
*G06F 17/30* (2006.01)
*G06F 16/28* (2019.01)
*G06F 16/2455* (2019.01)

(52) U.S. Cl.
CPC ........ *G06F 16/283* (2019.01); *G06F 16/2455* (2019.01)

(58) Field of Classification Search
CPC .... G06F 16/248; G06F 16/338; G06F 16/283; G06Q 10/067

(Continued)

(56) References Cited

U.S. PATENT DOCUMENTS 6,065,002 A * 5/2000 Knotts .................. G06F 16/252
707/999.004
7,120,572 B1 10/2006 Liang
(Continued)

OTHER PUBLICATIONS

Borne, Kirk, "The Big Data Train's Next BIG Destination—Cognitive Analytics", [retrieved on Sep. 16, 2016]. Retrieved from the Internet: <URL: https://www.mapr.com/blog/The-Big-Data-Trains-Next-Big-Destination-Cognitive-Analytics>, Jul. 3, 2014, 9 pgs.

(Continued)

*Primary Examiner* — Hicham Skhoun
(74) *Attorney, Agent, or Firm* — Michael O'Keefe; Matthew M. Hulihan; Heslin Rothenberg Farley & Mesiti PC (57) ABSTRACT

In the Business Intelligence (BI) realm, ad hoc reporting refers to relatively fast on-the-fly building of computer data reports in real-time. A process for pre-report execution based on an anticipated ad hoc reporting request is provided. This process predicts an ad hoc reporting request to generate an ad hoc report will be received from a user. Based on the ad hoc reporting request being predicted, and prior to receiving the ad hoc reporting request, the process dynamically generates and executes code to execute a query(ies) and acquires pre-request execution report data from execution of the query(ies). The ad hoc reporting request is received from the user, and based on receiving the ad hoc reporting request, the process identifies pre-request execution report data acquired prior to receiving the ad hoc reporting requests and generates the ad hoc report using the pre-request execution report data.

20 Claims, 7 Drawing Sheets

(58) Field of Classification Search
USPC .......................................................... 707/603
See application file for complete search history.

(56) References Cited

U.S. PATENT DOCUMENTS

| | | | | |
|---|---|---|---|---|
| 7,707,040 | B2* | 4/2010 | Lakhotia | G06Q 10/10 705/1.1 |
| 2004/0024763 | A1* | 2/2004 | Anderson | G06Q 10/10 707/999.009 |
| 2005/0278386 | A1* | 12/2005 | Kelly | G06F 16/29 707/999.2 |
| 2008/0091709 | A1* | 4/2008 | Chang | G06Q 10/06 707/999.102 |
| 2008/0248778 | A1* | 10/2008 | Boss | H04W 4/90 455/404.1 |
| 2010/0287014 | A1 | 11/2010 | Gaulin et al. | |
| 2013/0117650 | A1 | 5/2013 | MacLennan et al. | |
| 2013/0238551 | A1* | 9/2013 | Eshleman | G06Q 10/00 707/602 |
| 2016/0063056 | A1* | 3/2016 | Schmidt | G06F 16/245 707/603 |

OTHER PUBLICATIONS

Patel, Alpesh, "How to Create Ad-hoc report using SSRS and SSAS cube", [retrieved on Sep. 16, 2016]. Retrieved from the Internet: <URL: http://www.experts-exchange.com/articles/10658/How-to-Create-Ad-hoc-report-using-SSRS-and-SSAS-cube.html>, Aug. 13, 2012, 2 pgs.

"Apache Drill enables self-service data exploration on big data with a schema-free SQL query engine", [retrieved on Sep. 16, 2016]. Retrieved from the Internet: <URL: https://www.mapr.com/products/apache-drill>, © 2016 MapR Technologies, Inc., 1 pg.

"Architecture", [retrieved on Sep. 16, 2016]. Retrieved from the Internet: <URL: https://drill.apache.org/architecture/>, © 2012-2014 The Apache Software Foundation, 5 pgs.

Mell, Peter, et al., "The NIST Definition of Cloud Computing", NIST Special Publication 800-145, Sep. 2011, Gaithersburg, MD, 7 pgs.

He, Tian Ying, et al., "Building Ad-hoc Reporting Solutions with SQL Server 2005 Report Builder and Analysis Services OLAP", [retrieved on Dec. 5, 2016]. Retrieved from the Internet: < URL: https://technet.microsoft.com/en-us/library/aa964121%28v=sql.90%29.aspx>, Oct. 2006, 14 pgs.

* cited by examiner

FIG. 1

| Name of keyword | Name of dimension | Attribute |
|---|---|---|
| Keyword 1 | Dimension 1 | Attribute 1 |
| Keyword 2 | Dimension 2 | Attribute 2 |
| Keyword 3 | Dimension 3 | Attribute 3 |
| Keyword 4 | Dimension 4 | Attribute 4 |
| Keyword 5 | Dimension 5 | Attribute 5 |
| Keyword 6 | Dimension 5 | Attribute 5 |
| Keyword 7 | Dimension 5 | Attribute 5 |
| Keyword 8 | Dimension 5 | Attribute 5 |
| Keyword 9 | Measure | Measure 1 |
| Keyword 10 | Measure | Measure 2 |

PRE-REQUEST EXECUTION BASED ON AN ANTICIPATED AD HOC REPORTING REQUEST

BACKGROUND

In the Business Intelligence (BI) realm, "ad hoc reporting" refers to the relatively fast building of computer data reports by users according to their own information "requirements" in real-time, without relying on predefined, pre-coded templates. It is used typically as a form of information analysis, enabling users to connect BI software to data sources, identify on-the-fly the requirements of a report, and rapidly generate the report. Ad hoc reports can be of varying complexity, from a basic data table to a sophisticated multi-interface product with graphics and interactive elements.

While performing ad hoc reporting using a BI tool, a user selects the desired dimension/attributes and measures, applies filters, and then accordingly the BI engine will dynamically create code to execute the report, using the selected parameters, in backend database(s). The extracted data from the backend is ultimately presented in a generated ad hoc report. Even though BI reporting can be relatively quick, and pre-calculation may be done, often there is an issue with report performance, for instance in the time is takes to actually execute the report. Reports often take more time than expected or desired based on various factors including but not limited to the amount of data involved, the complexity of the dynamically generated code, network performance, and/or the number of concurrent users.

SUMMARY

Shortcomings of the prior art are overcome and additional advantages are provided through the provision of a computer-implemented method. The method predicts an ad hoc reporting request anticipated to be received from a user, the request being to generate an ad hoc report. The predicting includes predicting report objects of the ad hoc report and one or more queries to be executed in generating the report. Based on predicting the ad hoc reporting request, the method dynamically generates and executes code to execute the one or more queries, and acquires pre-request execution report data from the execution of the one or more queries. The method receives an ad hoc reporting request from the user based on a selection of the report objects by the user to generate the ad hoc reporting request, the received ad hoc reporting request being a request to generate the ad hoc report. Based on receiving the ad hoc reporting request, the method identifies the pre-request execution report data and generates the ad hoc report using the pre-request execution report data.

Further, a computer program product including a computer readable storage medium readable by a processor and storing instructions for execution by the processor is provided for performing a method. The method predicts an ad hoc reporting request anticipated to be received from a user, the request being to generate an ad hoc report. The predicting includes predicting report objects of the ad hoc report and one or more queries to be executed in generating the report. Based on predicting the ad hoc reporting request, the method dynamically generates and executes code to execute the one or more queries, and acquires pre-request execution report data from the execution of the one or more queries. The method receives an ad hoc reporting request from the user based on a selection of the report objects by the user to generate the ad hoc reporting request, the received ad hoc reporting request being a request to generate the ad hoc report. Based on receiving the ad hoc reporting request, the method identifies the pre-request execution report data and generates the ad hoc report using the pre-request execution report data.

Yet further, a computer system is provided that includes a memory and a processor in communications with the memory, wherein the computer system is configured to perform a method. The method predicts an ad hoc reporting request anticipated to be received from a user, the request being to generate an ad hoc report. The predicting includes predicting report objects of the ad hoc report and one or more queries to be executed in generating the report. Based on predicting the ad hoc reporting request, the method dynamically generates and executes code to execute the one or more queries, and acquires pre-request execution report data from the execution of the one or more queries. The method receives an ad hoc reporting request from the user based on a selection of the report objects by the user to generate the ad hoc reporting request, the received ad hoc reporting request being a request to generate the ad hoc report. Based on receiving the ad hoc reporting request, the method identifies the pre-request execution report data and generates the ad hoc report using the pre-request execution report data.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are facilities providing a cognitive method by which software can predict a user's subsequent ad hoc reporting requirements, in advance, while performing ad hoc analysis, and pre-execute the desired queries, making the data available to the user and ultimately achieving better performance. Aspects can ingest historical report navigation patters and habits for a corpus of users, such as those with similar interests and backgrounds, to determine what prerequisite and/or dynamic code to run to prepare for ad hoc reports. This allows a system to act upon prior dynamically generated code to influence the pre-request execution of report data without running additional queries against the database.

This provides an enhancement to BI software, such as Cognos® offered by International Business Machines Corporation, Armonk, N.Y., U.S.A. (of which COGNOS is a registered trademark), in which ad hoc reports of great value may be frequently used. Features described herein may be implemented in not only stand-alone installs of BI tools, but also in cloud BI offerings.

Software installed on, e.g., a client device, BI server, or other computer system, can gather various information relevant to the user's anticipated ad hoc reporting requests. Such information includes:

A user's historical report navigation patterns and habits and patterns, relating to combination(s) of different attributes, dimensions, measures, filter criteria, etc. that may be specified by the user in performing ad hoc reporting.

Current report usage behavior, like indications of dimensions or measures the user is focusing on, or a user's area of interest.

Any external and/or internal influential factors the user has viewed or been exposed to. For example, a governmental entity may publish new guidelines on CO2 emission, and CO2 emission may be a key parameter of the user's ad hoc reporting. Consequently, there is a chance that the user will use the report objects for the user's analysis.

External contributions from the user and/or any other party related to prior historic searches, recent meetings, email content, action items, recent social network contribution or posts, and any other digital activity of any user. Contextual analysis can be performed on the gathered data to determine if an identified context and keywords are related to a current scope of analysis. Based on this current usage behavior, software can predict a new set of one or more queries to be executed in the backend that will make the relevant data available for the visualization layer of the BI tool.

Software installed on, e.g., a BI server can predict a user's ad hoc data analysis requirements in a proactive manner. The BI server can dynamically generate and execute the code to obtain the report data, making it ready for a next predicted analysis. This pre-request execution report data may be maintained and used in the building of a report when actually requested by the user.

The software can proactively execute queries and make the data available for subsequent queries. The pre-request execution report data may be made available to a user's account in a proactive manner. Once the user selects report objects in defining an ad hoc reporting request, software can match the available pre-request execution report data to the request and may not have to run the appropriate query against the report database (because this query has already been done). The data going into the report when built can therefore be the pre-request execution report data previously acquired.

Software in the server can also consider various parameters in creating predicted queries and executing those, making the data available for the user's analysis. Accordingly, the query execution plan can be created. Example such parameters include but are not limited to:

(i) a data refresh pattern in the backend. If the data gets refreshed only at the end of each day, there is no need to re-execute queries for data that was already retrieved by the same or similar query earlier in the same day;

(ii) load and resource availability of the server;

(iii) user's usage behavior (see above where user behavior with, e.g., a client system is monitored); and (iv) volume of data for the predicted query.

Figure 1:
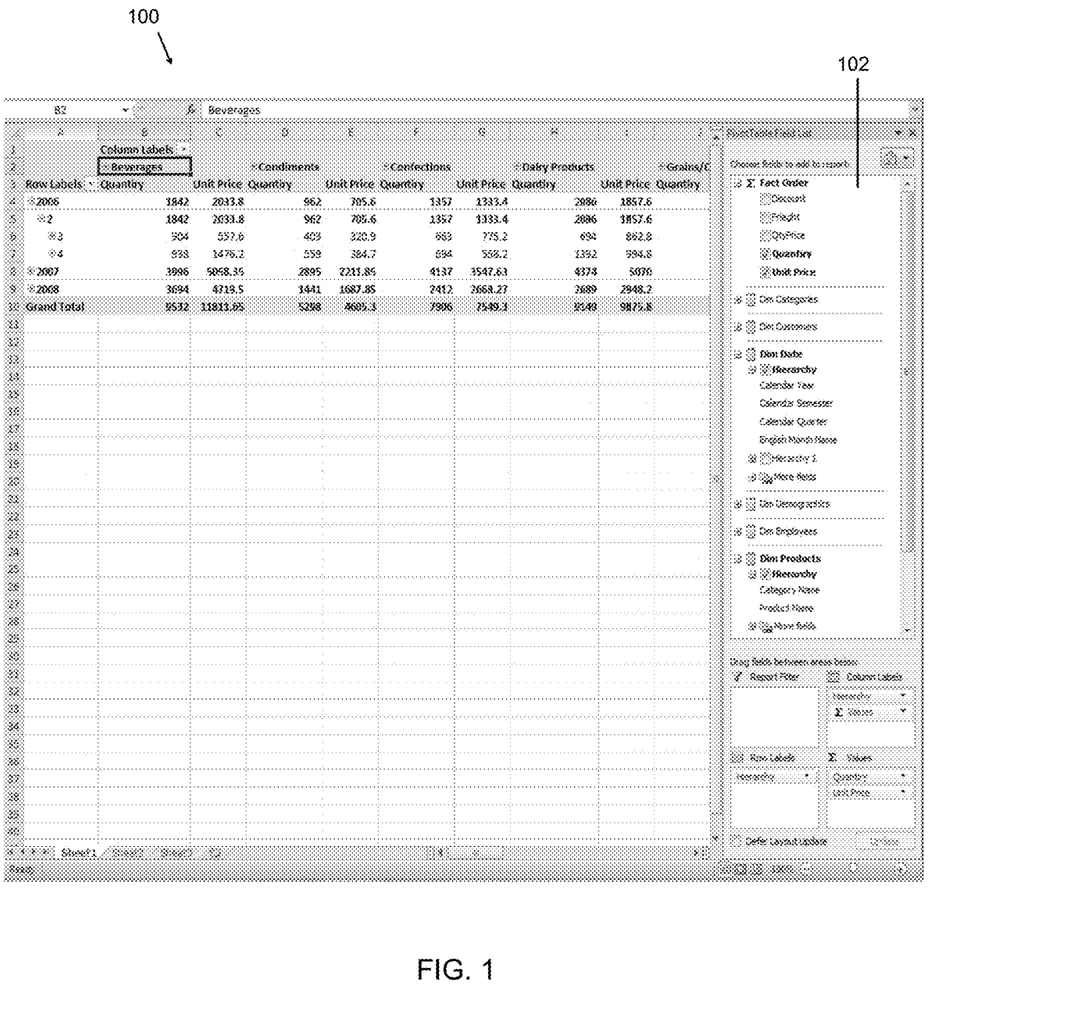
FIG. 1 depicts an example interface in which a user can perform ad hoc analysis.

FIG. 1 depicts an example interface in which a user can perform ad hoc analysis (also referred to as ad hoc reporting). In interface 100, the user drags and drops report objects and a report will be created. The user can select required measure, dimension, filter, etc. dragging and dropping into the report panel. The selection of fields to add to the report are shown in panel 102 on the right side of the interface.

Aspects described herein can predict the report objects and proactively create and execute queries so that no additional execution time is taken when the user performs the ad hoc reporting. In some examples, for each change a new query is executed in the backend.

Example implementations are now described. Initially, software installed as part of the BI tool or the device on which the BI tool is installed can gather historical report patterns of the user. The software can then identify:

(i) report object sets (combinations) used at a same point of time, for instance the combination of attributes, dimensions, measures, filters, and/or other report objects used for any given ad-hoc reporting;

(ii) the sequences of ad hoc reporting undertaken by the user. For example, the user may always or frequently check (i.e. generate a report on) weekly customer sales, followed by weekly customer returns;

(ii) the timing of such ad hoc reporting. For example, the user may check these specific reports on at noontime on Thursday of each week.

Figure 2:
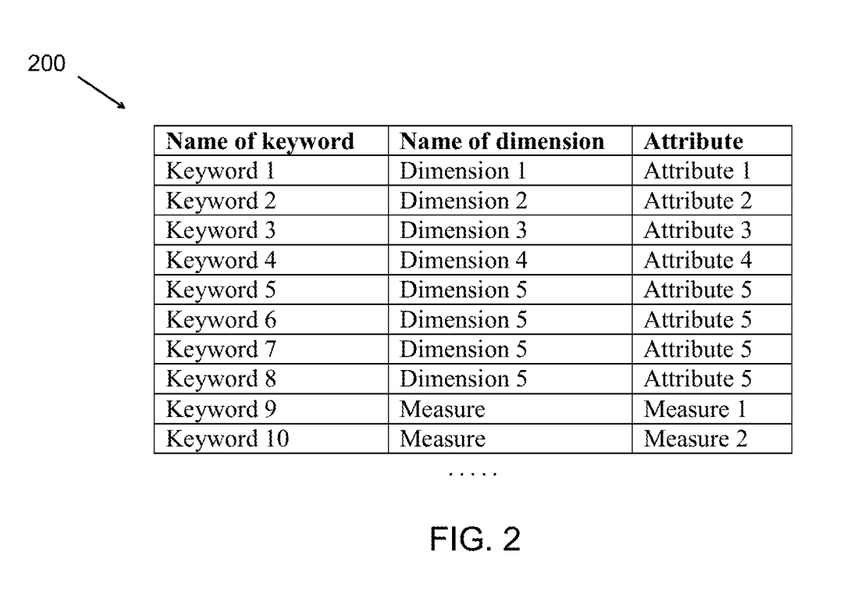
FIG. 2 depicts an example a data dictionary of an organization.

An organization with which the user is affiliated, for instance as an employee, can have a predefined data dictionary and ontology hierarchy defined. The data dictionary and ontology hierarchy may be accessible to respective business users. The BI system can also have (or have access to) this data dictionary and ontology structure. FIG. 2 depicts an example a data dictionary 200 of an organization, which includes a list of keywords, each corresponding to a dimension and attribute.

Figure 3:
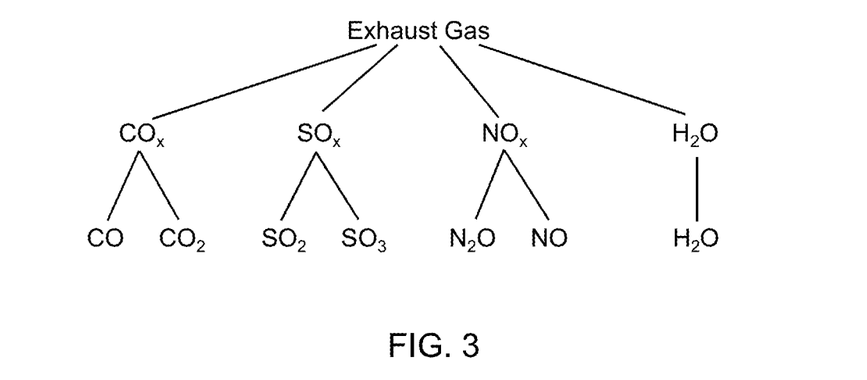
FIG. 3 depicts an example organizational ontology structure.

FIG. 3 depicts an example organizational ontology structure for Exhaust Gas, showing it includes COx, SOx, NOx, and H2O compounds.

Based on historical usage data, content is sought from different places. Software can track the user's recent content read or viewed, e.g. email, social network data, online news sources, online and/or offline documents etc., and software predict keywords that may be relevant to the user's reporting requirement.

For example, let Keyword 1, Keyword 2, Keyword 3 and Keyword 10 be example keywords discovered to be potentially relevant to the user's ad hoc reporting activities. Software can also perform contextual analysis of the content and usage of keywords. For instance, Keyword 1 may be used in the content in a negative sense (one which may result in losses for customers of the user that is performing the ad hoc reporting.

The user's device may have access to the enterprise data dictionary, ontology hierarchy, and BI system/server. The gathered data may be sent to an enterprise server, such as the BI server or one in communication with the BI server to convey the data. The contextual analysis, historical usage data, user's concentration towards a particular attribute, can be shared with this remote enterprise server.

The Enterprise server can perform a search of the enterprise data dictionary, ontology hierarchy, etc. for each identified keyword. Using the example of FIG. 2, the search would identify:

Keyword 1=Attribute 1 in Dimension 1;
Keyword 2=Attribute 2 in Dimension 2;
Keyword 3=Attribute 3 in Dimension 3; and
Keyword 10=Measure 2.

The server could predict that the user may want to perform an ad hoc reporting with Measure 2, where: [Dimension 1. Attribute 1=Keyword 1], [Dimension 2. Attribute 2=Keyword 2], and [Dimension 3. Attribute 3=Keyword 3].

A report server can identify the predicated ad hoc reporting requirement/request and, prior to the user selecting the ad hoc report objects, software can dynamically generate and execute the query in the backend, making the data available for when the report is requested.

Once the user selects the report objects, the software can obtain the data from wherever the proactively obtained data is maintained and display it in the visualization layer of the BI tool, improving user satisfaction and experience with the ad hoc reporting functionality.

In some aspects, embodiments use 'big data' for dynamic ad hoc reporting scenario identification and accordingly take the dynamic scenario as one input for cognitive report pre-execution, enabling the user to perform quicker analyses.

Figure 4:
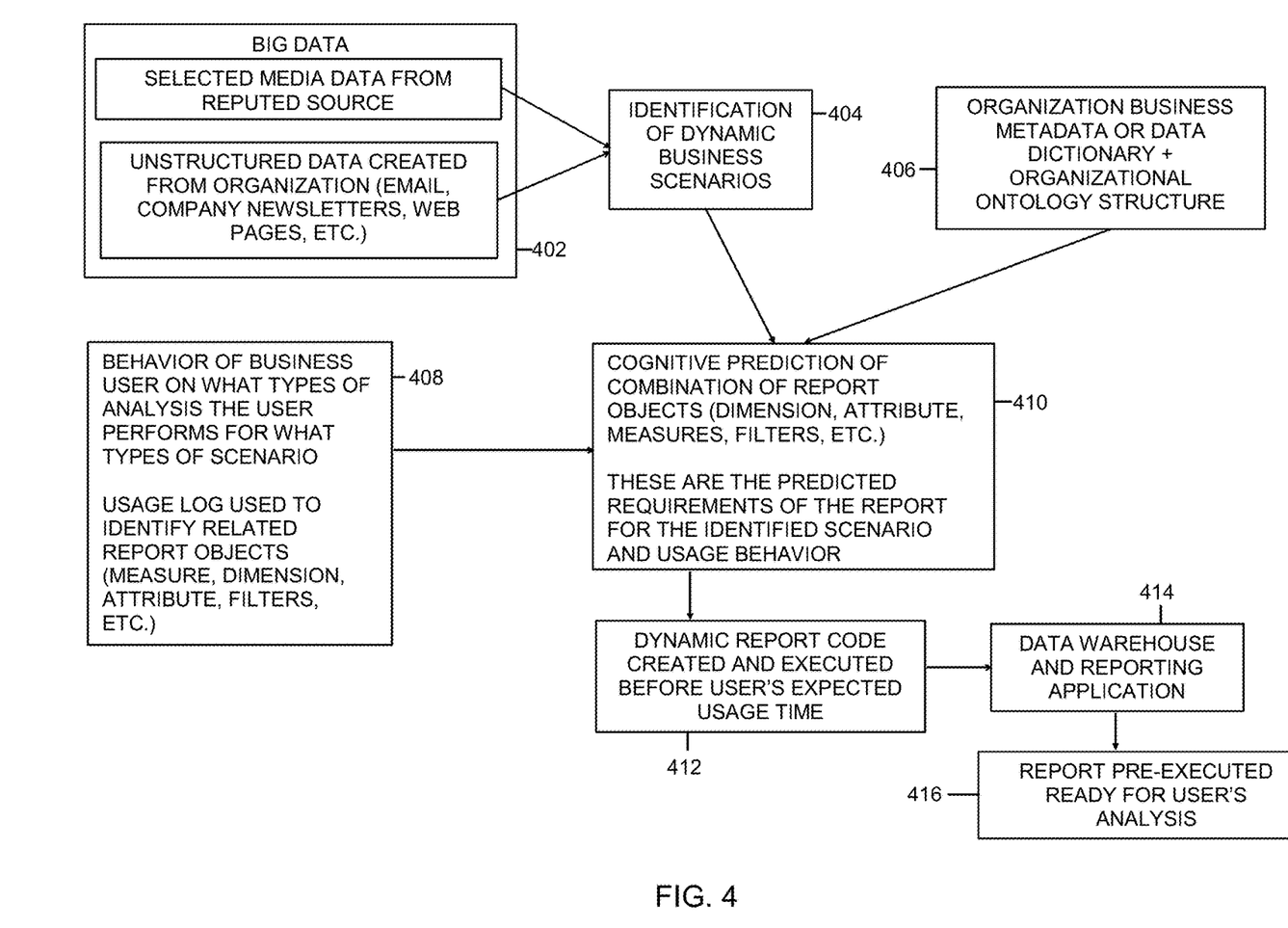
FIG. 4 depicts a conceptual flow for pre-request execution based on anticipated ad hoc reporting, in accordance with aspects described herein.

FIG. 4 depicts a conceptual flow for pre-request execution based on anticipated ad hoc reporting, in accordance with aspects described herein. It presents a cognitive and analytical model that can suggest what to be pre-executed for faster and more efficient user analysis. Big data 402, including selected media data from reputed source(s) and unstructured data created from the organization such as email, newsletters, web pages, etc.), is the basis for identifying dynamic business scenarios 404 potentially relevant to user ad hoc reporting. This identification, together with organization business metadata, data dictionary, and/or organizational ontology structure (406), and usage behavior of a business user regarding types of ad hoc reporting/analysis the user performs for various scenarios (408) are fed to a system (such as the BI server) to make a cognitive prediction of the combination of report objects (410). These are the predicted requirements of the report for an identified scenario and usage behavior. Then dynamic report code is created and executed (412) prior to the user's expected usage time (e.g. time the anticipated ad hoc reporting request is expected to be made). A data warehouse and reporting application (414) serves as the main source of the obtained pre-request execution report data. The report pre-executed is then ready for the user's analysis when the user requests the report (416).

In accordance with some aspects, the corpus of data available from different users (e.g. others in a user's organization, people in similar or same fields, as the user) reflects upon the possible data scenarios that might be important to the user when creating an ad hoc report, and consequently the gathering of information to formulate the pre-calculation queries that may be most relevant to the user's anticipated reporting request.

Additionally, aspects can determine elements (e.g. report objects) for the pre-calculation and execution of queries of anticipated ad hoc reports.

Accordingly, described herein are approaches for pre-request execution based on predicted/anticipated user ad hoc reporting request(s). An example process for pre-request execution based on anticipated ad hoc reporting is described and depicted with reference to FIG. 5. In some examples, the process is performed by one or more computer systems, such as those described herein, which may include one or more BI cloud servers, such as server(s) supporting one or more BI applications.

Figure 5:
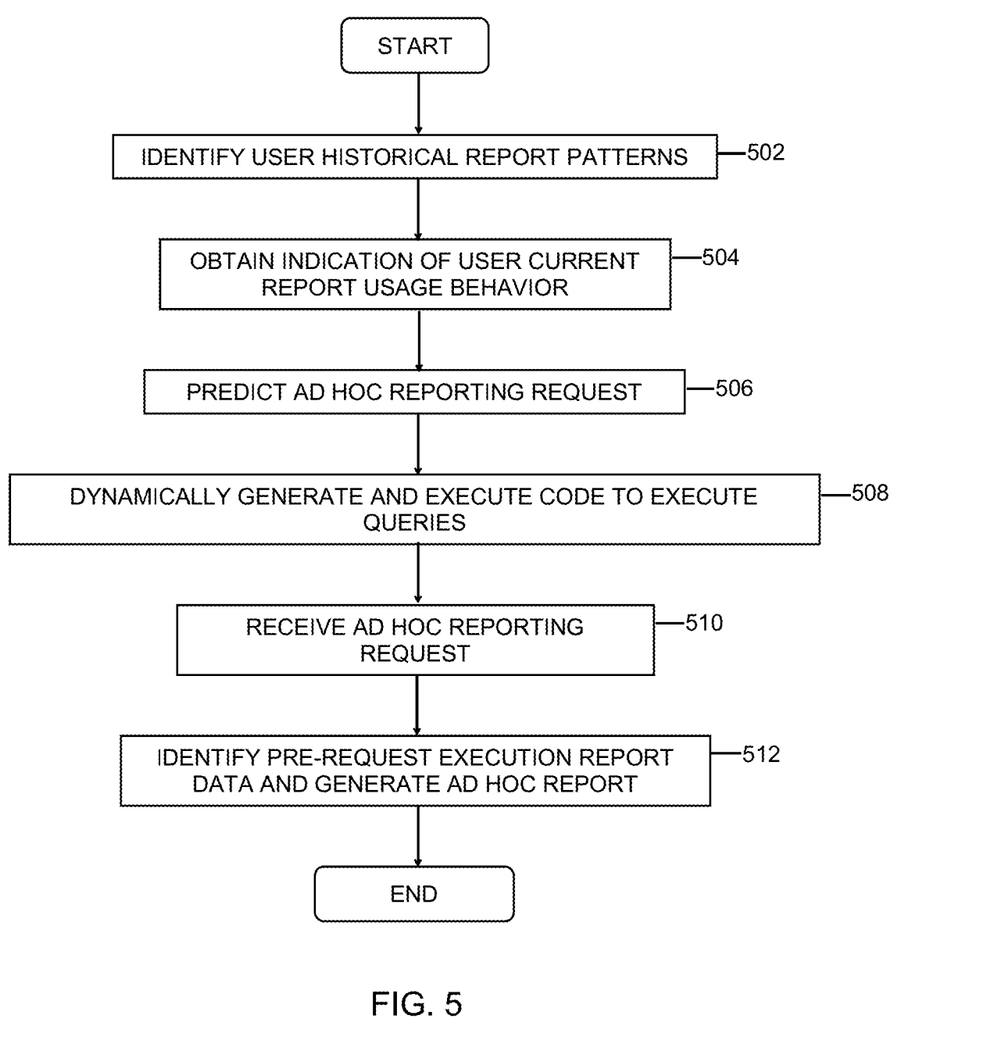
FIG. 5 depicts an example process for pre-request execution based on anticipated ad hoc reporting, in accordance with aspects described herein.

The process begins by identifying one or more historical report patterns in prior ad hoc reports requested by a user (502). A historical report pattern may include a repeated combination of report objects, such as attributes, dimensions, measures, filter criteria, etc., used by the user in prior ad hoc reporting requests. Additionally or alternatively, a historical report pattern may include a repeated sequence of ad hoc reporting requests including a first ad hoc reporting request and a sequentially-subsequent second ad hoc reporting request. Additionally or alternatively, a historical report pattern may include a repeated particular ad hoc reporting request received periodically in a given timeframe, such as when the user requests the same report periodically (daily, weekly, etc.).

The process continues with obtaining an indication of the user's current report usage behavior (504). This can include dimensions or measures (as examples) that are in-focus for the user, for instance that the user is viewing or interacting with in a BI tool.

The process then predicts an ad hoc reporting request anticipated to be received from a user (506). The request is to generate an ad hoc report, and the predicting can include predicting report objects of the ad hoc report and one or more queries to be executed in generating the report.

The predicting may be based at least in part on the identified one or more historical report patterns, and/or on the user's current report usage behavior. It is noted that the predicting may be based on factors not including the historical report patterns or user's current usage behavior, therefore 502 and 504 are optional.

With respect to the predicting of the ad hoc reporting request anticipated to be received (506), when a historical report pattern of the one or more historical report patterns includes a repeated combination of report objects, the predicted report objects can include that combination of report objects. Additionally or alternatively, when a historical report pattern of the one or more historical report patterns includes a repeated sequence of ad hoc reporting requests including a first ad hoc reporting request and a sequentially-subsequent second ad hoc reporting request, the predicted ad hoc reporting request can include the second ad hoc reporting request of the sequence, and the predicting may be based on the user requesting the first ad hoc reporting. In this manner, if the user always proceeds in a given sequence, the process can predict a report based on the user starting that sequence.

Additionally or alternatively, when a historical report pattern of the one or more historical report patterns includes a repeated particular ad hoc reporting request received periodically in a given timeframe, the predicted ad hoc reporting request can include the particular ad hoc reporting request, and the predicting may be based on a current time being within the given timeframe during a next period. For example if the user has historically run a particular ad hoc reporting between 10:00 AM and 11:00 AM every Thursday, the process may predict that the user will run the same ad hoc reporting in subsequent Thursdays during that timeframe.

In some examples, the predicting the report objects may be based on determining that updated information has been published about one or more report objects that the user has historically included in prior ad hoc reporting requests. For instance, if the user has historically included data relating $CO_2$ emissions and the report relies on current $CO_2$ standards, the system can monitor for publication of updated governmental guidelines on $CO_2$ standards, and automatically predict that the user will likely request the report in the near future to account for the new guidelines.

Returning to FIG. 5, based on predicting the ad hoc reporting request, the process dynamically generated and executed code to execute the one or more queries, and acquires pre-request execution report data from the execution of the one or more queries. The pre-request execution report data refers to the data obtained from running the one or more queries. Dynamically generating and executing the code to execute the one or more queries can include creating a query execution plan based on at least one selected from the group consisting of: a data refresh pattern in a database against which a query of the one or more queries is to be executed, a resource load in a server performing the dynamically generating and executing, the user's recent digital activity, and an amount of pre-request execution report data expected to be generated from the query.

The process continues by receiving an ad hoc reporting request from the user based on a selection of the report objects by the user to generate the ad hoc reporting request (510). The received ad hoc reporting request may be a request to generate the ad hoc report. Based on receiving the ad hoc reporting request, the process then identifies/obtains the pre-request execution report data and generates the ad hoc report using the pre-request execution report data (512).

Various processing may take place prior to predicting the ad hoc reporting request, for instance based on various information obtained. For instance, the process can further include ascertaining from the user's recent digital activity a plurality of keywords potentially relevant to the user's ad hoc reporting activities. The user's recent digital activity may include one or more of recent calendar events, recent action items, and recent social network contribution, or other digital activity. For instance, it may additionally or alternatively include interaction with offline and online documents. The keywords may be selected from the recent digital activity, for instance from the offline and online documents.

The process might also track user content of the user, the user content including one or more of: email content of the user, social network content of the user, and online news source content viewed by the user. In this regard, the ascertaining of the plurality of keywords may be from the tracked user content as the user's recent digital activity.

The processing can also obtain a data dictionary and ontological structure of an organization with which the user is associated, search the data dictionary and ontological structure for the plurality of keywords to identify report objects correlated to the plurality of keywords, and perform the predicting the ad hoc reporting request and the report objects thereof based on the identified report objects correlated to the plurality of keywords. The predicted report objects can include the identified report objects correlated to the plurality of keywords.

Additionally or alternatively, processing can further include performing a contextual analysis of a usage of a keyword of the plurality of keywords to ascertain a context in which the keyword is used. The ascertained context may then be used to identify the ad hoc report for which the ad hoc reporting request is predicted to be received.

Although various examples are provided, variations are possible without departing from a spirit of the claimed aspects.

Figure 6:
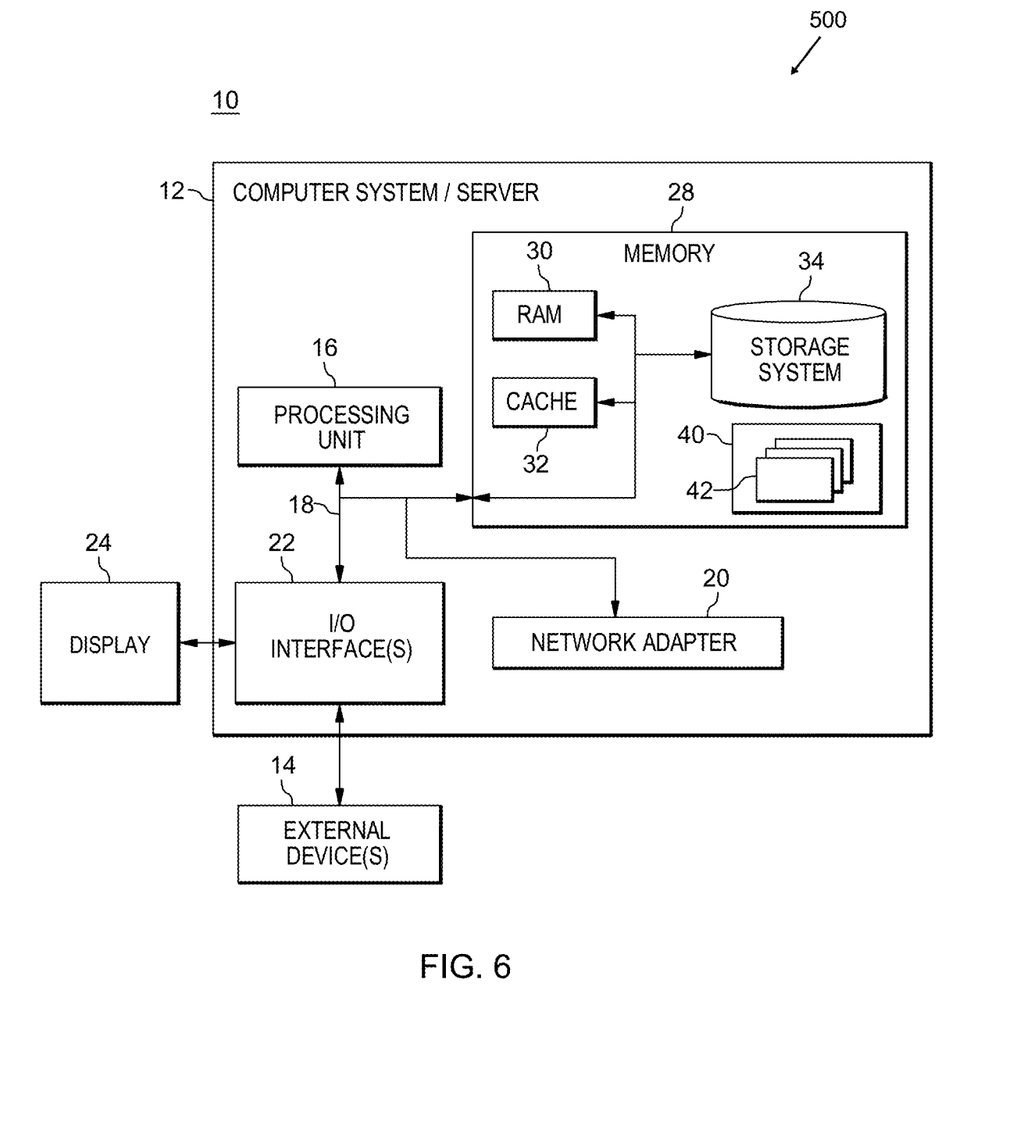
FIG. 6 depicts one example of a computer system and associated devices to incorporate and/or use aspects described herein.

Processes described herein may be performed singly or collectively by one or more computer systems, such as one or more cloud servers or backend computers (e.g. one or more social network servers), home network servers, smart device or other network-connected devices, or a combination of the foregoing. FIG. 6 depicts one example of such a computer system and associated devices to incorporate and/or use aspects described herein. A computer system may also be referred to herein as a data processing device/system or computing device/system/node, or simply a computer. The computer system may be based on one or more of various system architectures such as those offered by International Business Machines Corporation (Armonk, N.Y., USA), Intel Corporation (Santa Clara, Calif., USA), or ARM Holdings plc (Cambridge, England, United Kingdom), as examples.

As shown in FIG. 6, a computing environment 500 includes, for instance, a node 10 having, e.g., a computer system/server 12, which is operational with numerous other general purpose or special purpose computing system environments or configurations. Examples of well-known computing systems, environments, and/or configurations that may be suitable for use with computer system/server 12 include, but are not limited to, personal computer (PC) systems, server computer systems, thin clients, thick clients, workstations, laptops, handheld devices, mobile devices/computers such as smartphones, tablets, and wearable devices, multiprocessor systems, microprocessor-based systems, telephony device, network appliance (such as an edge appliance), virtualization device, storage controller set top boxes, programmable consumer electronics, smart devices, intelligent home devices, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in many computing environments, including but not limited to, distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media such as erasable programmable read-only memory (EPROM or Flash memory). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more computer application programs, other program modules, and program data. Computer programs may execute to perform aspects described herein. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Input/Output (I/O) devices (including but not limited to microphones, speakers, accelerometers, gyroscopes, magnetometers, sensor devices configured to sense light, ambient temperature, levels of material), activity monitors, GPS devices, cameras, etc.) may be coupled to the system either directly or through I/O interfaces 22. Still yet, computer system/server 12 may be able to communicate with one or more networks such as a local area network (LAN), a general wide area network (WAN), and/or a public network (e.g., the Internet) via network adapter 20. As depicted, network adapter 20 communicates with the other components of computer system/server 12 via bus 18. Network adapter(s) may also enable the computer system to become coupled to other computer systems, storage devices, or the like through intervening private or public networks. Ethernet-based (such as Wi-Fi) interfaces and Bluetooth® adapters are just examples of the currently available types of network adapters used in computer systems.

It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 6.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 7:
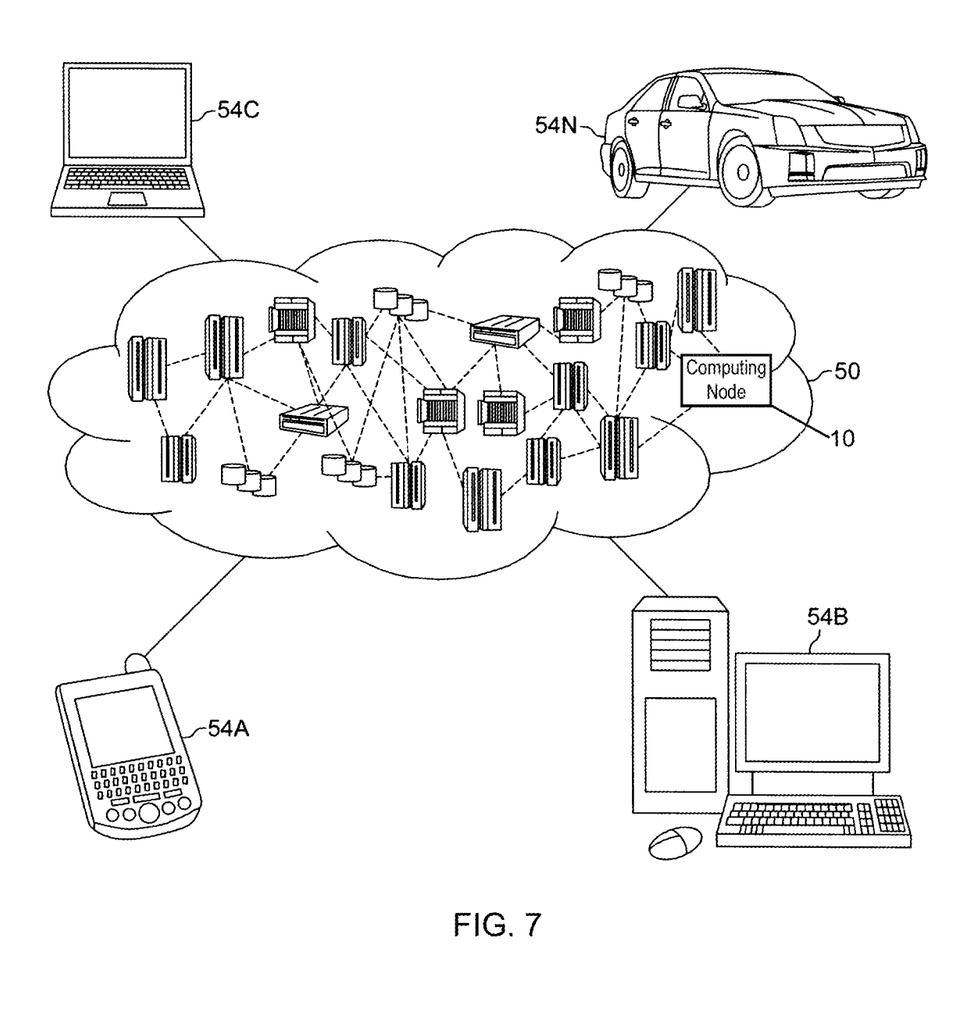
FIG. 7 depicts one embodiment of a cloud computing environment.

Referring now to FIG. 7, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
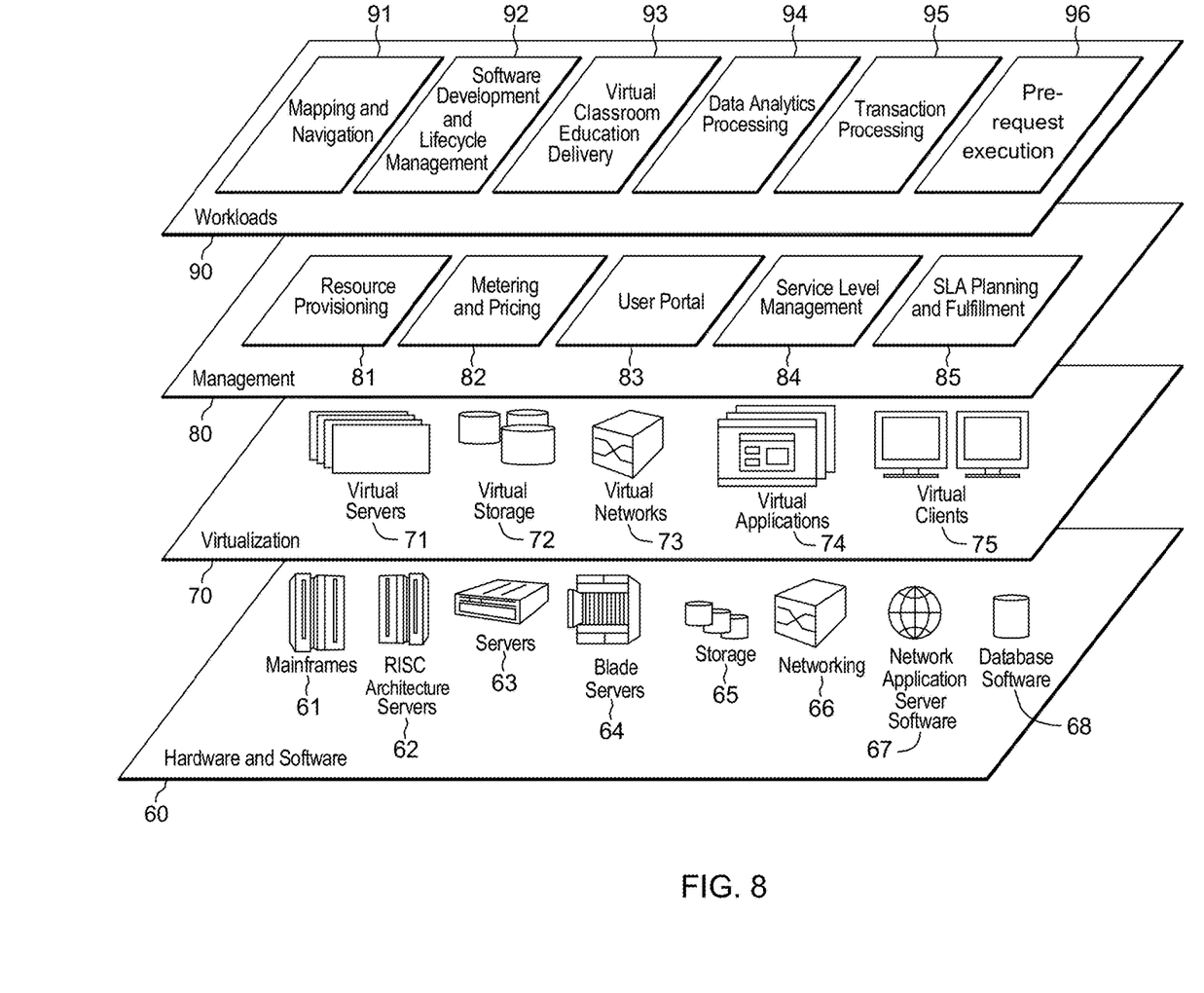
FIG. 8 depicts one example of abstraction model layers.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and pre-request execution 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
predicting that an ad hoc reporting request to generate an ad hoc report will be received from a user, wherein the predicting comprises predicting report objects of the ad hoc reporting request to be received and one or more queries to be executed in generating the ad hoc report, wherein the predicted report objects include elements predicted to be selected by the user in generating the ad hoc reporting request that is predicted to be received from the user;
based on predicting the ad hoc reporting request, and prior to receiving the ad hoc reporting request, dynamically generating and executing code to execute the one or more queries, and acquiring pre-request execution report data from the execution of the one or more queries prior to receiving the ad hoc reporting request;
receiving the ad hoc reporting request from the user based on a selection of the report objects by the user to generate the ad hoc reporting request, the received ad hoc reporting request being a request to generate the ad hoc report; and
based on receiving the ad hoc reporting request, identifying the pre-request execution report data acquired prior to receiving the ad hoc reporting request, and generating the ad hoc report using the pre-request execution report data acquired prior to receiving the ad hoc reporting request.

2. The method of claim 1, further comprising identifying, prior to receiving the ad hoc reporting request, one or more historical report patterns in prior ad hoc reports requested by the user, wherein the predicting that the ad hoc reporting request will be received from a user is based at least in part on the identified one or more historical report patterns.

3. The method of claim 2, wherein a historical report pattern of the one or more historical report patterns comprises a repeated combination of report objects, and wherein the predicted report objects comprise the combination of report objects.

4. The method of claim 2, wherein a historical report pattern of the one or more historical report patterns comprises a repeated sequence of ad hoc reporting requests including a first ad hoc reporting request and a sequentially-subsequent second ad hoc reporting request, wherein the predicted ad hoc reporting request comprises the second ad hoc reporting request of the sequence, and the predicting is based on the user requesting the first ad hoc reporting.

5. The method of claim 2, wherein a historical report pattern of the one or more historical report patterns comprises a repeated particular ad hoc reporting request received periodically in a given timeframe, wherein the predicted ad hoc reporting request comprises the particular ad hoc reporting request, and the predicting is based on a current time being within the given timeframe during a next period.

6. The method of claim 1, further comprising obtaining, prior to receiving the ad hoc reporting request, an indication of the user's current report usage behavior, including dimensions or measures that are in-focus for the user, wherein the predicting is based on the user's current report usage behavior.

7. The method of claim 1, wherein the predicting the report objects is based on determining that updated information has been published about one or more report objects that the user has historically included in prior ad hoc reporting requests.

8. The method of claim 1, further comprising:
ascertaining, prior to receiving the ad hoc reporting request, from the user's recent digital activity a plurality of keywords potentially relevant to the user's ad hoc reporting activities;
obtaining, prior to receiving the ad hoc reporting request, a data dictionary and ontological structure of an organization with which the user is associated;
searching, prior to receiving the ad hoc reporting request, the data dictionary and ontological structure for the plurality of keywords to identify report objects correlated to the plurality of keywords; and
performing, prior to receiving the ad hoc reporting request, the predicting the ad hoc reporting request and the report objects thereof based on the identified report objects correlated to the plurality of keywords, wherein the predicted report objects comprise the identified report objects correlated to the plurality of keywords.

9. The method of claim 8, further comprising tracking user content of the user, the user content selected from the group consisting of email content of the user, social network content of the user, and online news source content viewed by the user, wherein the ascertaining is from the tracked user content as the user's recent digital activity.

10. The method of claim 8, wherein the user's recent digital activity is selected from the group consisting of recent calendar events, recent action items, and recent social network contribution.

11. The method of claim 8, wherein the user's recent digital activity comprises interaction with offline and online documents, and wherein at least a subset of the plurality of keywords are selected from the offline and online documents.

12. The method of claim 8, further comprising performing, prior to receiving the ad hoc reporting request, a contextual analysis of a usage of a keyword of the plurality of keywords to ascertain a context in which the keyword is used, wherein the ascertained context is used to identify the ad hoc report for which the ad hoc reporting request is predicted to be received.

13. The method of claim 1, wherein the dynamically generating and executing the code to execute the one or more queries comprises creating a query execution plan based on at least one selected from the group consisting of: a data refresh pattern in a database against which a query of the one or more queries is to be executed, a resource load in a server performing the dynamically generating and executing, the user's recent digital activity, and an amount of pre-request execution report data expected to be generated from the query.

14. The method of claim 1, wherein the predicting is based at least in part on monitored user activity to generate prior-requested ad hoc reports.

15. A computer system comprising:
a memory; and
a processor in communication with the memory, wherein the computer system is configured to perform a method, the method comprising:
predicting that an ad hoc reporting request to generate an ad hoc report will be received from a user, wherein the predicting comprises predicting report objects of the ad hoc reporting request to be received and one or more queries to be executed in generating the ad hoc report, wherein the predicted report objects include elements predicted to be selected by the user in generating the ad hoc reporting request that is predicted to be received from the user;
based on predicting the ad hoc reporting request, and prior to receiving the ad hoc reporting request, dynamically generating and executing code to execute the one or more queries, and acquiring pre-request execution report data from the execution of the one or more queries prior to receiving the ad hoc reporting request;
receiving the ad hoc reporting request from the user based on a selection of the report objects by the user to generate the ad hoc reporting request, the received ad hoc reporting request being a request to generate the ad hoc report; and
based on receiving the ad hoc reporting request, identifying the pre-request execution report data acquired prior to receiving the ad hoc reporting request, and generating the ad hoc report using the pre-request execution report data acquired prior to receiving the ad hoc reporting request.

16. The computer system of claim 15, wherein the method further comprises identifying, prior to receiving the ad hoc reporting request, one or more historical report patterns in prior ad hoc reports requested by the user, wherein the predicting that the ad hoc reporting request will be received from a user is based at least in part on the identified one or more historical report patterns.

17. The computer system of claim 15, wherein the predicting the report objects is based on determining that updated information has been published about one or more report objects that the user has historically included in prior ad hoc reporting requests.

18. The computer system of claim 15, wherein the method further comprises:

ascertaining, prior to receiving the ad hoc reporting request, from the user's recent digital activity a plurality of keywords potentially relevant to the user's ad hoc reporting activities;
obtaining, prior to receiving the ad hoc reporting request, a data dictionary and ontological structure of an organization with which the user is associated;
searching, prior to receiving the ad hoc reporting request, the data dictionary and ontological structure for the plurality of keywords to identify report objects correlated to the plurality of keywords; and
performing, prior to receiving the ad hoc reporting request, the predicting the ad hoc reporting request and the report objects thereof based on the identified report objects correlated to the plurality of keywords, wherein the predicted report objects comprise the identified report objects correlated to the plurality of keywords.

19. The computer system of claim 18, wherein the method further comprises tracking user content of the user, the user content selected from the group consisting of email content of the user, social network content of the user, and online news source content viewed by the user, wherein the ascertaining is from the tracked user content as the user's recent digital activity.

20. A computer program product comprising:
a computer readable storage medium readable by a processing circuit and storing instructions for execution by the processing circuit for performing a method, the method comprising:
predicting that an ad hoc reporting request to generate an ad hoc report will be received from a user, wherein the predicting comprises predicting report objects of the ad hoc reporting request to be received and one or more queries to be executed in generating the ad hoc report, wherein the predicted report objects include elements predicted to be selected by the user in generating the ad hoc reporting request that is predicted to be received from the user;
based on predicting the ad hoc reporting request, and prior to receiving the ad hoc reporting request, dynamically generating and executing code to execute the one or more queries, and acquiring pre-request execution report data from the execution of the one or more queries prior to receiving the ad hoc reporting request;
receiving the ad hoc reporting request from the user based on a selection of the report objects by the user to generate the ad hoc reporting request, the received ad hoc reporting request being a request to generate the ad hoc report; and
based on receiving the ad hoc reporting request, identifying the pre-request execution report data acquired prior to receiving the ad hoc reporting request, and generating the ad hoc report using the pre-request execution report data acquired prior to receiving the ad hoc reporting request.

* * * * *